Aug. 11, 1931.   A. V. ROWE   1,818,583
LAWN MOWER
Filed Nov. 26, 1928    3 Sheets-Sheet 3

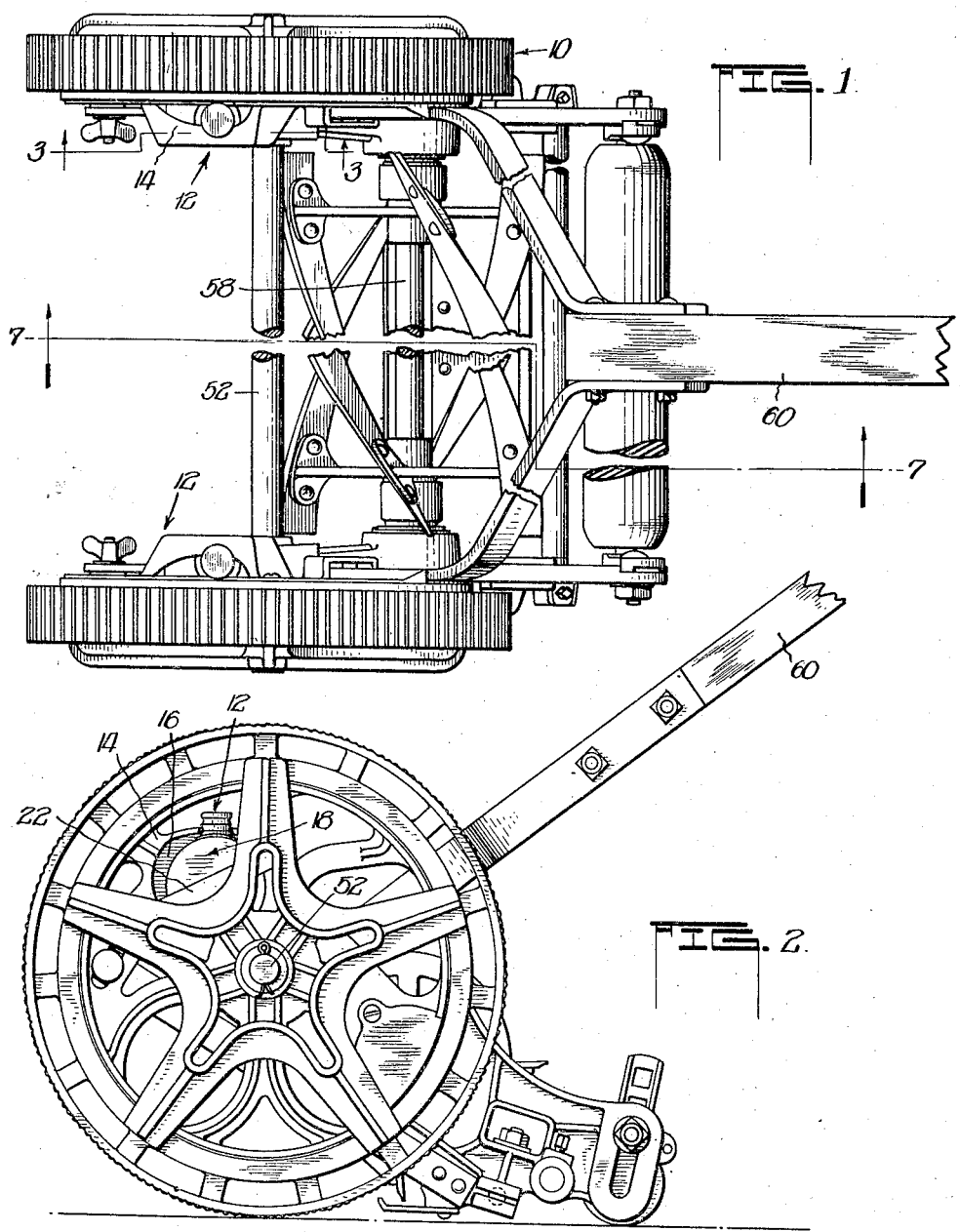

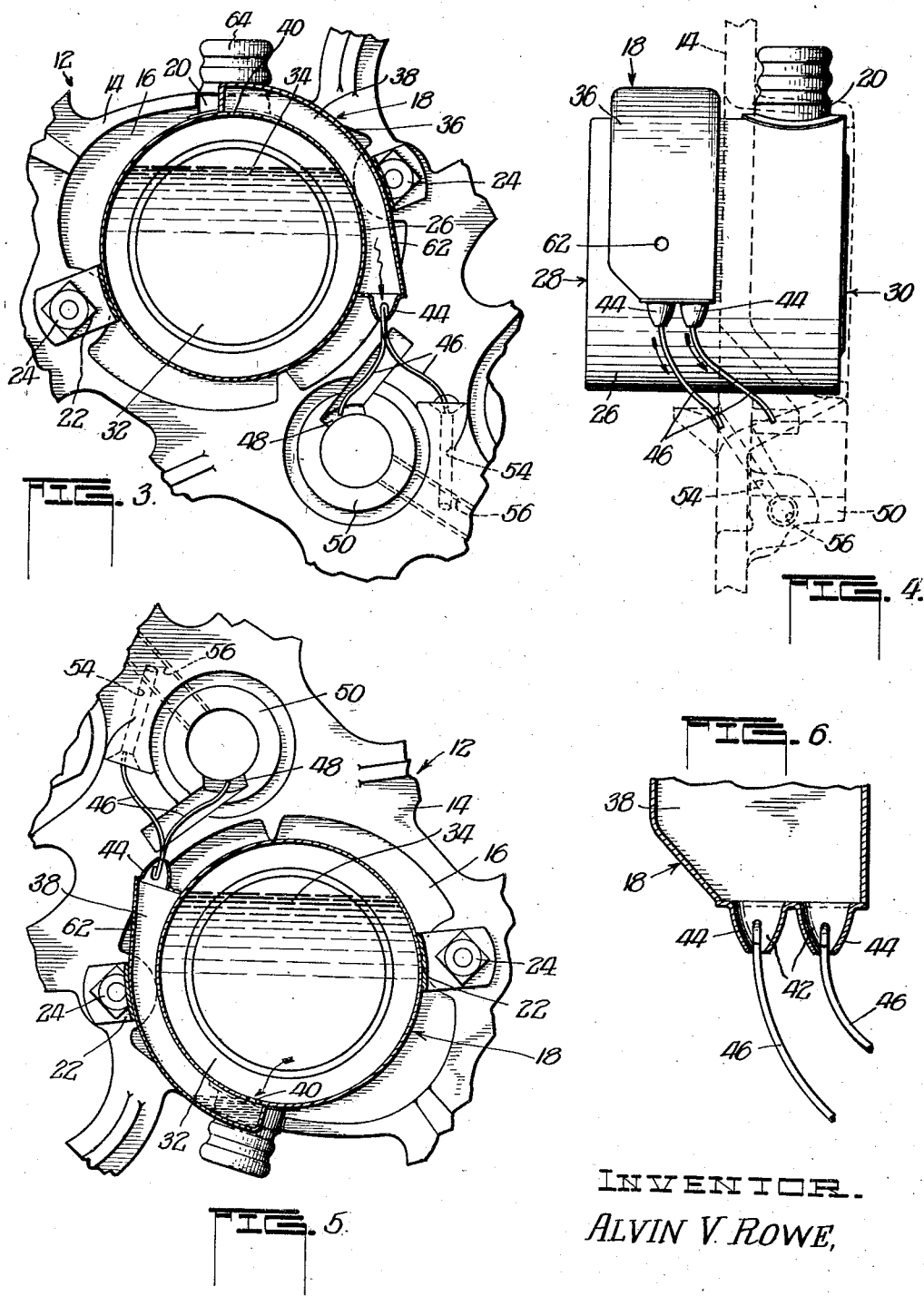

INVENTOR.
ALVIN V. ROWE,
BY Cheever & Cox
ATTYS.

Patented Aug. 11, 1931

1,818,583

UNITED STATES PATENT OFFICE

ALVIN V. ROWE, OF GALESBURG, ILLINOIS, ASSIGNOR TO ROWE MANUFACTURING COMPANY, OF GALESBURG, ILLINOIS, A CORPORATION OF ILLINOIS

LAWN MOWER

Application filed November 26, 1928. Serial No. 321,802.

My invention relates generally to lawn mowers and particularly to lubricating devices adapted to be used with lawn mowers and the like.

Experience has shown that in many instances one of the chief causes for unsatisfactory operation of lawn mowers resides in the fact that the user does not properly service the same. In other words, the lawn mower is usually taken from its place of storage within the basement or garage, put into use and then returned to the storage position without giving any attention to proper adjustment or lubrication. In conventional types of lawn mowers it is common practice to supply lubricant thereto through the agency of an oil can.

One of the primary objects of my present invention is to overcome the above mentioned and other difficulties normally incident to the operation of lawn mowers and devices of like nature and to this end I propose to provide a simple and durable means which may readily be applied to the mechanism to be lubricated and which will serve as an effective means for insuring proper lubrication of said mechanism with a minimum amount of effort on the part of the user.

Another object of my invention is to provide, in combination with a lawn mower or other mechanism to be lubricated, means which is adapted to be operated when said mechanism is abnormally positioned so as to effectively supply lubricant thereto.

Still another object of my invention is to provide, in combination with a lawn mower or other device, a lubricating means consisting of a chamber for retaining a supply of lubricant and a pressure or forcing means which is adapted to be operated when the mechanism as a whole is shifted to an abnormal position so as to cause a supply of lubricant to issue from the chamber which may be directed into association with the parts of the mechanism to be lubricated.

A still further and more specific object of my present invention is to provide a lubricating means in combination with a mechanism to be lubricated, said lubricating means having a chamber for retaining a lubricant, a restricted opening through which the lubricant may issue when the mechanism, as a whole, is abnormally positioned, and means for leading the lubricant from said aperture to the part to be lubricated.

Still more specifically, an object of my invention is to provide a lubricating device, as above set forth, in which a chamber is provided for retaining a supply of lubricant, and a secondary chamber associated therewith which is adapted, in response to a change in the position of the mechanism with which the lubricating device is associated, to receive a supply of lubricant from the first mentioned chamber, and when said mechanism occupies its normal operating position, the supply within the secondary chamber will be directed to the part to be lubricated, thereby insuring proper lubrication with a minimum amount of effort on the part of the user.

These and other objects will be more apparent from the following detailed description, when considered in connection with the accompanying drawings wherein—

Figure 1 is a fragmentary plan view of a lawn mower equipped with a lubricating device embodying features of my invention;

Figure 2 is a side elevational view of the device shown in Figure 1;

Figure 3 is a vertical sectional view of the lubricating mechanism taken substantially along the line 3—3 of Figure 1;

Figure 4 is a side elevational view of the lubricant container as viewed from the right of Figure 3;

Figure 5 is a view similar to Figure 3 disclosing the inverted position of the lubricating mechanism resulting from the abnormal position of the lawn mower as a whole;

Figure 6 is an enlarged detailed sectional view of the discharge extremity of the secondary chamber, disclosing the manner in which the lubricant exudes through the restricted openings and is directed to the machine parts through the agency of the conductors;

Figure 7:
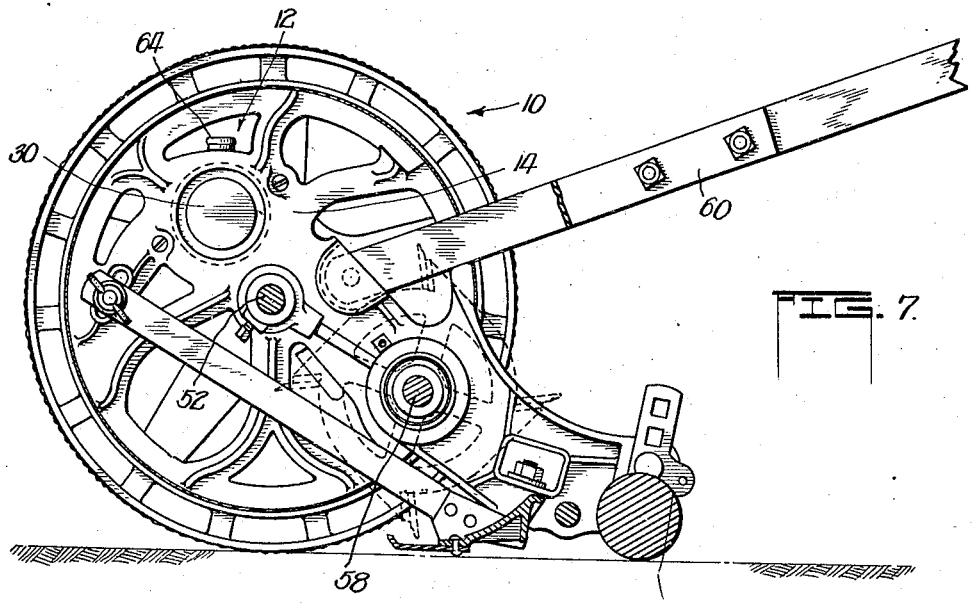
Figure 7 is a vertical sectional view taken substantially along the line 7—7 of Figure 1.

Referring now to the drawings more in detail wherein like numerals have been employed to designate similar parts throughout the various figures, it will be observed that, for the purpose of illustrating one practical application of a lubricating device constructed and arranged in accordance with the teachings of my invention, I have disclosed this device in association with a lawn mower designated generally by the numeral 10. This lubricating device or mechanism is also designated generally by the numeral 12 and it will be observed that these lubricating devices include a frame 14 which forms a part of the frame structure of the lawn mower which is not rotated as the lawn mower is being used.

The frame 14 is provided with a recess 16, Figures 2, 3 and 5, which is designed to receive one end of a lubricant receptacle or container designated generally by the numeral 18. This receptacle 18 is adapted, when the lawn mower assumes the normal position shown in Figures 1 to 3 inclusive, to be inserted within the recess 16, as clearly shown in Figure 3, with the neck portion 20 of said container extending upwardly through an opening which communicates with said recess. When the container is thus positioned, a U-shaped strap 22 may be applied so as to traverse the outer face or end of the receptacle. This strap is adapted to be secured to the frame 14 by means of suitable tightening nuts 24.

The container or receptacle 18 comprises a cylindrical casing or housing 26 and spring end walls 28 and 30, a chamber 32 being presented within said walls for retaining a supply of lubricant 34. Enclosed within a companion casing 36, which is mounted upon the peripheral surface of the cylindrical casing 26, is a secondary or auxiliary chamber 38, Figures 3 and 5. One end of this chamber 38 communicates with the chamber 32 through the agency of a restricted opening 40. The opposite extremity of the chamber 38 is provided with a pair of reduced discharge openings 42 which are located at the terminating portions of outwardly extending nipples 44. Projecting into these restricted openings 42 are lubricant conducting members or wires 46. It will be observed that the inner extremities of these conducting members are enlarged so as to prevent the same from being pulled out from the nipples 44 and further, that the diameter of these conducting members is less than the diameter of the constricted discharge openings 42. By having the members 46 of such a size, lubricant from within the chamber 38 may be free to flow outwardly through the openings 42 and thence along the members 46.

The outer extremities of the conducting members 46 may be directed to any point at which a supply of lubricant may be required. Thus, in the specific embodiment shown in the drawings, one of these conductors is disclosed as terminating at a point indicated by the numeral 48 within a bearing 50 which supports the shaft 52 of the lawn mower. The other conducting member 46 terminates within a duct 54 which communicates with a second duct 56 and this second duct 56 serves as a means for communicating with the bearing in which the cutter shaft 58, Figure 1, is mounted, or with any other parts which are in need of continued lubrication.

Figure 8:
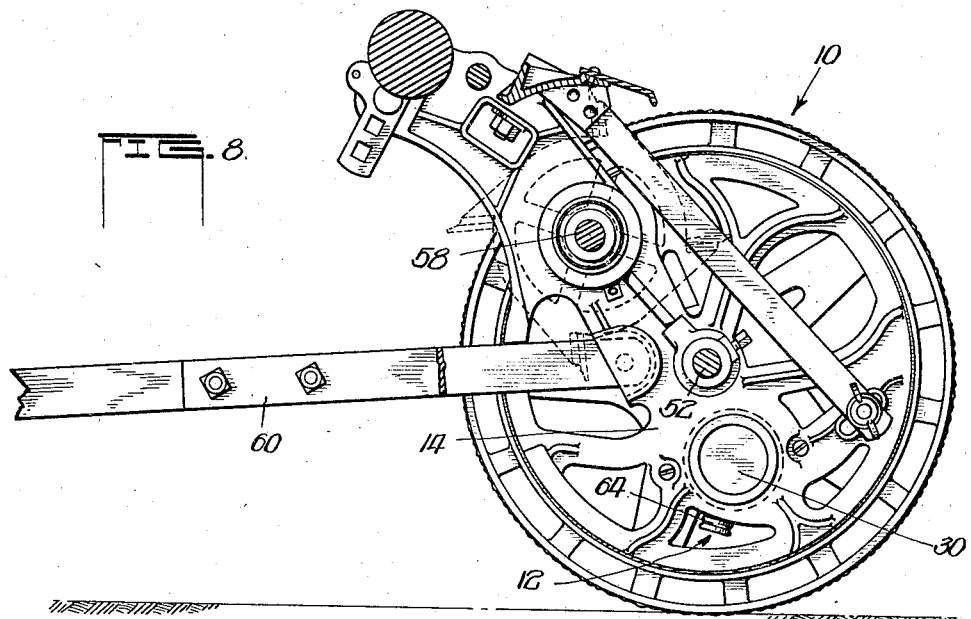
Figure 8 is a similar vertical sectional view showing the lawn mower swung to its abnormal position for lubricating.

From the foregoing description it will be apparent that when the lawn mower 10 as a whole is shifted or, in other words, when the handle 60 thereof is moved to the left so as to cause the container 18 to assume an inverted position as shown in Figures 5 and 8, the restricted opening 40 provides a means for allowing a portion of the lubricant 34 to be directed into the lower extremity of the chamber 38. In order to force the required amount of lubricant into the chamber 38, it is only necessary to subject the end wall of the container 18 to a series of pulsations or vibrations. In other words, by manually applying pressure to the end wall 30, lubricant from within the chamber 32 may be forced outwardly through the restricted opening 40 and into the secondary or auxiliary chamber 38. In order to prevent air from being trapped at the upper end of the chamber 38 when lubricant is being supplied thereto in response to pressure applied to the end wall of the container, I provide a vent or opening 62, Figures 3 to 5 inclusive. When the required amount of lubricant has been withdrawn from the main reservoir or chamber 32, the lawn mower handle 60 may be swung to the right so as to move the lawn mower as a whole to its normal operating position as shown in Figures 1 to 3 inclusive.

When the lawn mower as a whole is shifted back to its normal position in the manner described, the quantity of lubricant just withdrawn from the main chamber 32 will be carried by gravity into association with the nipples 44. The lubricant will be equally distributed through the discharge openings 42 upon the conductor members 46 and will be directed by these members into association with the parts to be lubricated. Thus a quantity of lubricant may be withdrawn from the main chamber each time the lawn mower is shifted or abnormally positioned so as to supply the proper amount of lubricant to the rotative parts of the lawn mower. By having the restricted discharge openings 42, as well as the conductor members 46 of uniform size, equal amounts of lubricant may be distributed along these members and thus a convenient means is provided for uniformly distributing the lubricant to the main wheel bearings. By directing one of the conductor members 46 into association with the ball-bearing race in which the cutter or reel shaft 58 is mounted, it is possible to get lubricant into said race without the possibility of introducing foreign matter such as grit or gum. Thus the bearings are free running at all times.

From the foregoing it will be apparent that my invention provides a very effective lubricating system or device which is particularly adaptable for use in connection with lawn mower bearings. By having the lubricant container secured in a fixed position on each of the side frames 14, a supply of lubricant may be carried by the lawn mower in a position to be used at any time. In other words, my improved device overcomes the inconvenience of seeking for an oil can each time the lawn mower is to be lubricated. Furthermore, my invention contemplates the provision of a device which will positively supply lubricant to the lawn mower parts with very little effort on the part of the user. In fact, it is only necessary for the user to swing or shift the handle of the lawn mower so as to move the structure as a whole to an abnormal position, apply pressure to the spring wall of the container and then shift the lawn mower back to its normal position. The container is designed to retain a supply of oil which will be sufficient to keep the lawn mower supplied with a proper amount of lubricant over an extended period of time and hence need only be filled at infrequent intervals. To refill the container it is only necessary to remove a cap 64 which is threaded upon the neck 20.

Obviously, my invention is not limited to the specific type of lubricating device disclosed but contemplates the use of various types and modifications which are adapted to be operated when the mechanism to which said devices are applied, are shifted to an abnormal position. In other words, my invention contemplates the provision of a lubricating device which may readily be applied to such mechanism as lawn mowers or other mechanisms of like nature, said lubricating device being operable, when the lawn mower is moved to an abnormal position, to permit a predetermined quantity of lubricant from a supply thereof to be directed into association with the bearings and other rotative parts which should be lubricated at predetermined intervals in order to insure longevity and proper functioning of the lawn mower.

Having thus described my invention, what I claim as new and desire to secure by Letters Patent is:

1. In combination with a lawn mower having bearings to be lubricated, a lubricating device of the class described comprising a casing carried by said lawn mower, said casing having a chamber for retaining a lubricant, and means operable only when the lawn mower is moved to a non-cutting position, to withdraw a quantity of lubricant from said chamber and direct the same into association with the bearings of said lawn mower only when the position of said lawn mower is varied.

2. In combination with a lawn mower having bearings to be lubricated, a lubricating device of the class described including a casing adapted to be carried by the frame of the lawn mower, said casing having a chamber for retaining a lubricant, means operable for forcing lubricant from within the chamber only when said lawn mower occupies a non-cutting position, and means for directing the quantity of lubricant thus removed from the chamber into association with the bearings of the lawn mower when said lawn mower occupies its normal cutting position.

3. In combination with a mechanism to be lubricated, a lubricating system including a cylindrical chamber for receiving a lubricant and having a peripheral vent, a secondary chamber for receiving a supply of lubricant from said first chamber through said vent when the mechanism as a whole is shifted, said secondary chamber being formed peripherally of the first chamber, and means associated with said secondary chamber for leading lubricant therefrom to the part to be lubricated.

4. In combination with a mechanism to be lubricated, a lubricating system including a cylindrical chamber for receiving a lubricant and having a peripheral vent, and a secondary chamber for receiving a supply of lubricant from said first chamber through said vent when the mechanism as a whole is shifted, one of said chambers being formed peripherally with respect to the other.

5. In combination with a lawn mower construction having a frame and a rotary cutter mounted in said frame, a lubricating system including a lubricant container, a secondary chamber for receiving a supply of lubricant from said first chamber only when the lawn mower occupies a non-cutting position, and means connecting said secondary chamber with the parts to be lubricated, said secondary chamber being arranged to deliver lubricant to said connecting means when the lawn mower occupies a substantially normal grass cutting position.

6. The combination with a lawn mower having a frame and a rotary cutter mounted in said frame, a lubricating system including a container for containing a supply of lubricant, and a secondary container having an opening for receiving lubricant from the first container only when the lawn mower structure occupies a non-cutting position and an orifice through which said separated lubricant may flow to a point externally of the chamber when the lawn mower occupies a substantially normal cutting position.

7. In combination with a lawn mower having a pair of spaced side frames and a rotary cutter mounted in said frames, a lubricating system including a lubricant container supported adjacent each side frame, each of said containers including a main chamber for retaining a supply of lubricant, and a secondary chamber for receiving a supply of lubricant from the the first chamber when the lawn mower structure occupies a non-cutting position, and means for directing lubricant from said secondary chamber to the parts to be lubricated, only when the lawn mower occupies a substantially normal cutting position.

8. In combination with a mechanism adapted to be shifted between operative and inoperative positions and having a part to be lubricated, a lubricating device of the class described mounted on said mechanism having a chamber for retaining a lubricant, a passage communicating with said chamber and adapted to effect the discharge of lubricant from said chamber only when said mechanism occupies its inoperative position, and a second chamber for receiving lubricant from said passage when the mechanism occupies its inoperative position, said chamber being adapted to effect the discharge of said withdrawn fluid to the part to be lubricated when the mechanism is again shifted to its operative position.

9. In combination with a mechanism adapted to be shifted between operative and inoperative positions and having a part to be lubricated, a lubricating device of the class described mounted on said mechanism having a chamber for retaining a lubricant, a passage communicating with said chamber and adapted to effect the discharge of lubricant from said chamber only when said mechanism occupies its inoperative position, and a second chamber for receiving lubricant from said passage when the mechanism occupies its inoperative position, said chamber being adapted to effect the discharge of said wihdrawn fluid to the part to be lubricated when the mechanism is again shifted to its operative position, said chambers being in constant communication through said passage regardless of the position occupied by said mechanism.

In witness whereof, I have hereunto subscribed my name.

ALVIN V. ROWE.